United States Patent
Patten et al.

(10) Patent No.: US 9,036,977 B2
(45) Date of Patent: May 19, 2015

(54) AUTOMATIC DETECTION, REMOVAL, REPLACEMENT AND TAGGING OF FLASH FRAMES IN A VIDEO

(75) Inventors: Michael J. Patten, Seattle, WA (US); Sam Wookey, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1877 days.

(21) Appl. No.: 11/726,444

(22) Filed: Mar. 22, 2007

(65) Prior Publication Data

US 2008/0232765 A1 Sep. 25, 2008

(51) Int. Cl.
- *H04N 9/80* (2006.01)
- *G11B 27/034* (2006.01)
- *G06T 5/50* (2006.01)
- *G11B 27/28* (2006.01)
- *G11B 27/30* (2006.01)

(52) U.S. Cl.
CPC ........... *G11B 27/034* (2013.01); *G06T 5/50* (2013.01); *G06T 2207/10016* (2013.01); *G06T 2207/20216* (2013.01); *G11B 27/28* (2013.01); *G11B 27/3036* (2013.01)

(58) Field of Classification Search
CPC ........... G06K 9/00248; G06K 9/0061; G06K 9/00664; G06K 9/38; G06K 9/00791; G06K 9/4614; G06K 9/00221; G06K 9/6807; G11B 20/10; G06T 5/00; G06T 5/50
USPC .................................. 386/239, 248
See application file for complete search history.

(56) References Cited

U.S. PATENT DOCUMENTS

| | | | | |
|---|---|---|---|---|
| 4,329,719 A * | 5/1982 | Ninomiya | ...... | 386/318 |
| 5,802,240 A * | 9/1998 | Asai | ...... | 386/283 |
| 2002/0047936 A1* | 4/2002 | Tojo | ...... | 348/700 |
| 2003/0152363 A1 | 8/2003 | Jeannin et al. | | |
| 2004/0244047 A1* | 12/2004 | Shinkai et al. | ...... | 725/115 |
| 2006/0152634 A1 | 7/2006 | Yeh et al. | | |

FOREIGN PATENT DOCUMENTS

| | | |
|---|---|---|
| EP | 1 420 406 | 5/2004 |
| JP | 2005-210485 | 8/2005 |
| KR | 1020050015380 | 2/2005 |
| KR | 1020060034931 | 4/2006 |

OTHER PUBLICATIONS

Extended European Search Report issued in connection with corresponding European Application No. 08 74 3598, mailed Sep. 6, 2012 (8 pages).

(Continued)

*Primary Examiner* — Tat Chio
(74) *Attorney, Agent, or Firm* — Bryan Webster; Kate Drakos; Micky Minhas

(57) ABSTRACT

A method for automatically detecting, eliminating and replacing flash frames in digital video utilizes the detected flash frames to categorize and tag the surrounding frames as a relevant area of the digital video. The flash frame is detected when acquiring digital video during capture, the flash frame is replaced with a newly-constructed frame that is interpolated based upon surrounding frames and then, using the detected flash as the timestamp, the frame is tagged.

17 Claims, 8 Drawing Sheets

(56) References Cited

OTHER PUBLICATIONS

Nunnapus Benjama et al., "Flashlight Detection in Indoor Sport Videos for Highlight Generation," 2nd International Conference on Electrical Engineering/Electronics, Computer, Telecommunications and Information Technology, pp. 534-537 (4 pages), Jan. 1, 2005.

* cited by examiner

AUTOMATIC DETECTION, REMOVAL, REPLACEMENT AND TAGGING OF FLASH FRAMES IN A VIDEO

BACKGROUND

Personal home videos are commonly utilized to record significant events involving one's family and friends, such as birthdays, holidays, weddings, graduations, etc. The amount of home video material can be very large—the raw unedited total duration may easily accumulate to hours within a short period.

While professional video is typically shot in a controlled studio environment in which lighting and sound is closely controlled, most consumer/amateur video is shot in an uncontrolled environment, in which lighting is not well controlled. In addition, in many cases, the presence of other video cameras and/or still photography equipment adds to the distortions that may arise from such an uncontrolled environment.

Flashes produced by other consumer photography equipment are generally viewed as a negative event by the viewer of a video stream that has recorded the scene including the flash. Although the flash may temporarily improve the lighting environment from the perspective of the still photography equipment that generated the flash, it requires the video camera videotaping the same scene to quickly adjust light levels and thereby significantly and adversely affects the viewability and quality of the video recording. Additionally, current consumer video equipment does not use these flash events to provide any beneficial value to the video.

This Background is provided to introduce a brief context for the Summary and Detailed Description that follows. This Background is not intended to be an aid in determining the scope of the claimed subject matter nor be viewed as limiting the claimed subject matter to only those implementations that may solve any or all of the disadvantages or problems presented above.

SUMMARY

Flash events created by other local photography equipment can be automatically detected in the video stream.

Once detected, these flash events can be removed from the video stream and replaced by calculated frame(s) that are interpolated from the previous and subsequent frames in the video stream.

Metadata can be added to the video stream that indicates where these flash events occurred. The premise is that the flash events will be highly correlated to significant points of interest in the video stream in that they were generated by an observer, who by taking a still flash photograph, indicated a particular point of interest was occurring.

The above three steps; detection, removal, and marking of flash events in a video stream, should all be done in real time, so as to not require buffering and storage issues in the processing of a video stream. Hence, all the calculations involved must be relatively simplistic and not require overwhelming processing power.

This Summary is provided to introduce a selection of concepts in a simplified form that are further described below in the Detailed Description. The benefits and advantages noted in this Summary are not intended to limit the claimed subject matter to only those implementations that contain those benefits or advantages. In addition, this Summary is not intended to identify key features or essential features of the claimed subject matter, nor is it intended to be used as an aid in determining the scope of the claimed subject matter.

DETAILED DESCRIPTION

Producing high quality consumer video presents a challenge in that most consumer video is shot in an uncontrolled environment.

One element that corrupts video is flash photography. While recording a scene using a video camera, if another user takes a photo with a flash, the video scene contains the flash which reduces the quality of the video since the video camera has to quickly adjust light levels. If there are several flashes, these can be distracting in the finalized video.

However, flashes provide useful information in that if while shooting video someone takes a photo with a flash, that particular moment in time is more likely to be of higher importance. Using the timestamp when a flash occurs, the video clip can be tagged as being more relevant. The metadata may relate to an entire scene of the video (e.g., as defined by time codes), or to only single frames. This additional metadata can then be used by video editing software to enable variable content presentation when modifying a video or creating a movie. The entire video can be automatically analyzed to include additional metadata fields to better support subsequent information retrieval (i.e., a user can get to precisely the clip they are interested in viewing in an hour long video without taking an hour to view the entire video). The additional metadata provides an indication that one or more flashes were detected at certain points in the video (and therefore it can be assumed that those locations of the video were of importance) and can be used by applications such as Microsoft Windows Movie Maker that incorporate technology to automatically jump to tagged video clips or to create a movie based on the clips and the metadata contained in the clip. This enables a viewer to find the points of interest in a potentially long video without requiring the viewer to scan the entire video to find those points of interest.

The proposed method relies upon the premise that still photography camera flash events that are detected in a video stream indicate that another "observer" has essentially watched the same video (albeit possibly from a different angle or perspective) and this observer's choice to take a still photograph is an indication that, from the observer's perspective, a particular point of interest was occurring at that point in time in the video.

The volume of raw consumer video footage is exploding. The proposed concepts provide an automatic method for essentially indexing the exploding quantity of content and providing a means in which to filter through the rough footage and find the areas of interest therein by effectively relying upon another viewer of the video as a reviewer.

Figure 1:
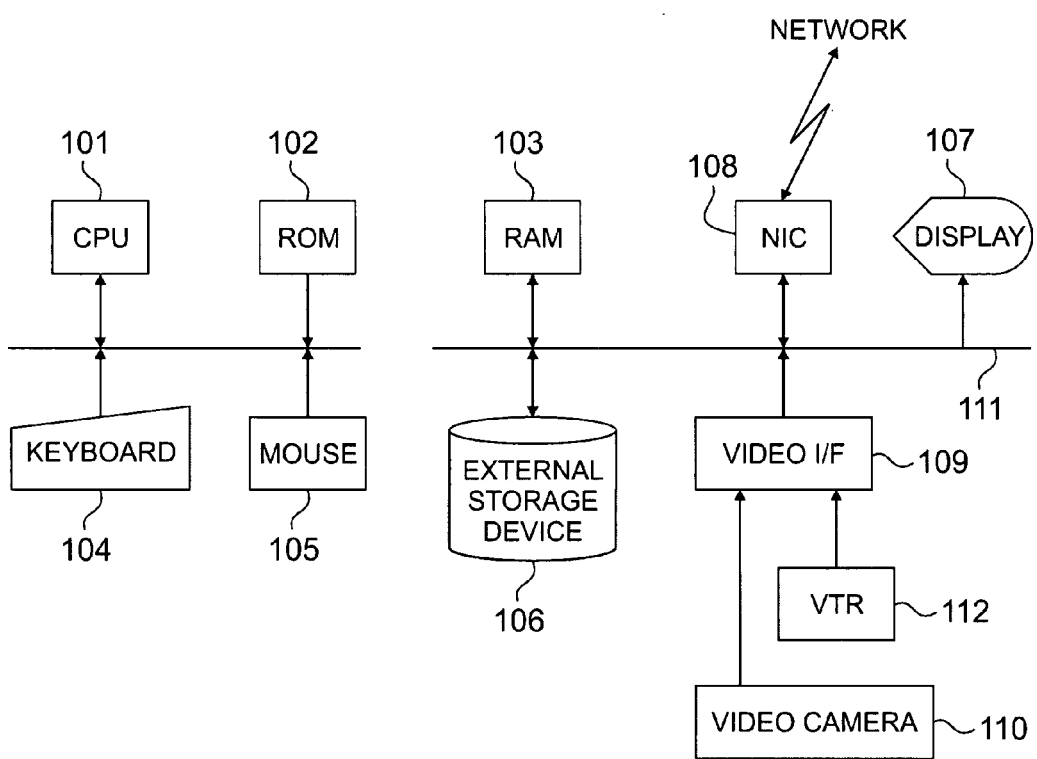
FIG. 1 is a simplified block diagram of an illustrative computer system environment in which the detection and removal of flashes and tagging of the corresponding area of video may be implemented.

FIG. 1 is a block diagram showing the control arrangement of a video image processing apparatus which can be used in respective embodiments of the present invention. Referring to FIG. 1, reference numeral 101 denotes a CPU for executing various kinds of control in scene extraction. Reference numeral 102 denotes a ROM which stores a boot program executed upon starting up this apparatus, and various data. Reference numeral 103 denotes a RAM which stores a control program to be processed by the CPU 101, and provides a work area used when the CPU 101 executes various kinds of control. Reference numeral 104 denotes a keyboard; and 105, a mouse, both of which provide various input operation environments by the user. Reference numeral 106 denotes an external storage device which comprises a hard disk, floppy disk, CD-ROM, or the like. Reference numeral 107 denotes a display which comprises, e.g., a CRT display, and displays the processing result and the like to the user. Reference numeral 108 denotes a network interface (NIC) which allows communications with devices on the network. Reference numeral 109 denotes a video interface (such as an IEEE 1394 card or an analog video capture card) which allows capturing of a moving image from a video camera 110 and VTR 112. Reference numeral 111 denotes a bus for interconnecting the aforementioned building components.

Note that the video camera 110, VTR 112, and external storage device 106 of the aforementioned building components may be replaced by those connected to the network.

Figure 2:
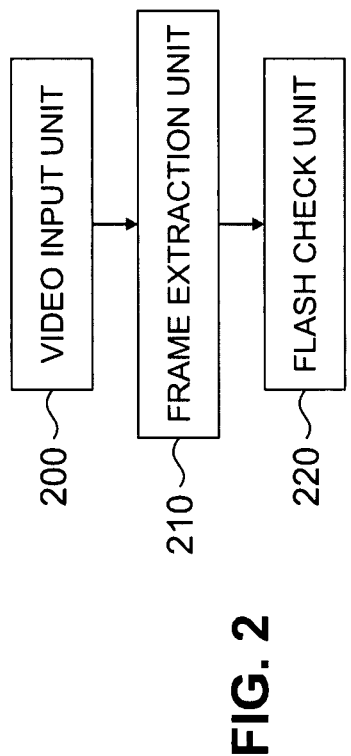
FIG. 2 is a block diagram showing an illustrative functional arrangement of a video processing apparatus of one embodiment.

FIG. 2 is a block diagram showing the functional arrangement of one embodiment of a video image processing apparatus. Referring to FIG. 2, reference numeral 200 denotes a video input unit for inputting a video captured from the video camera 110, VTR 112, or the like via the video interface 109 or a video captured from a device on the network via the network interface 108. Reference numeral 210 denotes a frame extraction unit for extracting frames (images) that form the video. Reference numeral 220 denotes a flash check unit for checking a flash portion in the video.

Various known video editing software allow for non-linear editing of video. Non-linear editing provides the ability to access any frame in a video clip with the same ease as any other. Typically, video and audio data are first digitized to hard disks or other digital storage devices (the data may be either recorded directly to the storage device or imported from another source). Once imported they can be edited on a computer using any of a wide range of software.

A computer used for non-linear editing of video will usually have a video capture card for capturing analog video or a FireWire connection for capturing digital video from a digital video camera, as well as video editing software. Modern web-based editing systems can take video directly from a camera phone over a mobile connection, and editing can take place through a web browser interface, so strictly speaking, a computer for video editing does not require any installed hardware or software beyond a web browser and an internet connection.

Various editing tasks, including those proposed herein of flash detection, removal and tagging, can then be performed on the imported video before it is exported to another medium, or MPEG encoded for transfer to a DVD.

The processing sequence of a flash detection function implemented by the video image processing apparatus of a first embodiment with the aforementioned arrangement will be explained below using FIG. 3.

Figure 4:
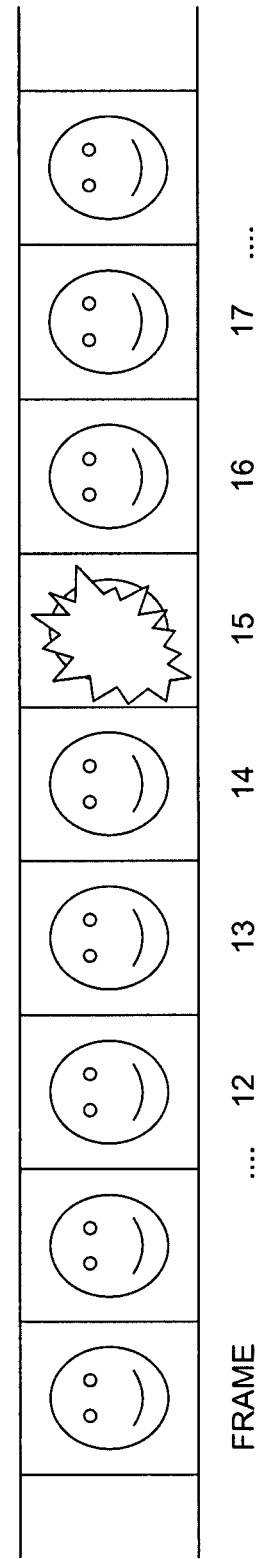
FIG. 4 shows an exemplary sequence of frames in which a flash is present.
Figure 3:
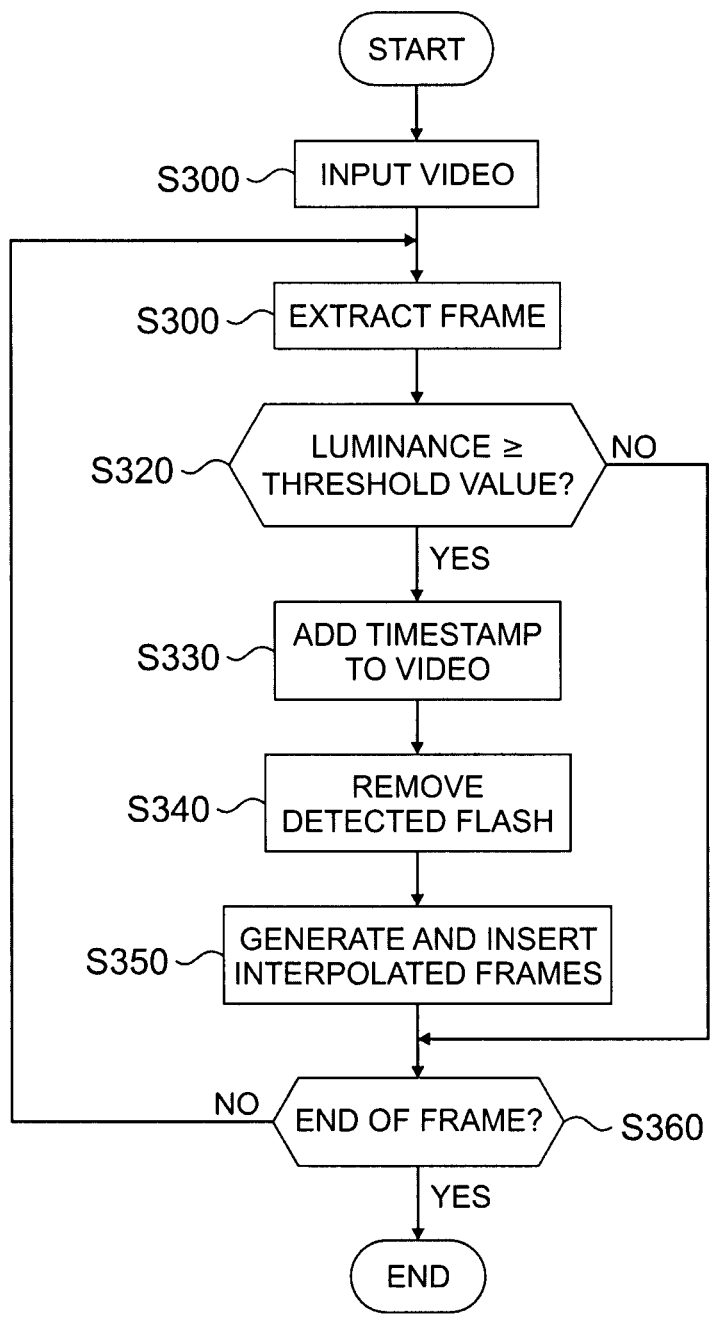
FIG. 3 is a flow chart showing an illustrative processing sequence of a flash detection, removal and timestamp functions of one embodiment.
Figure 5:
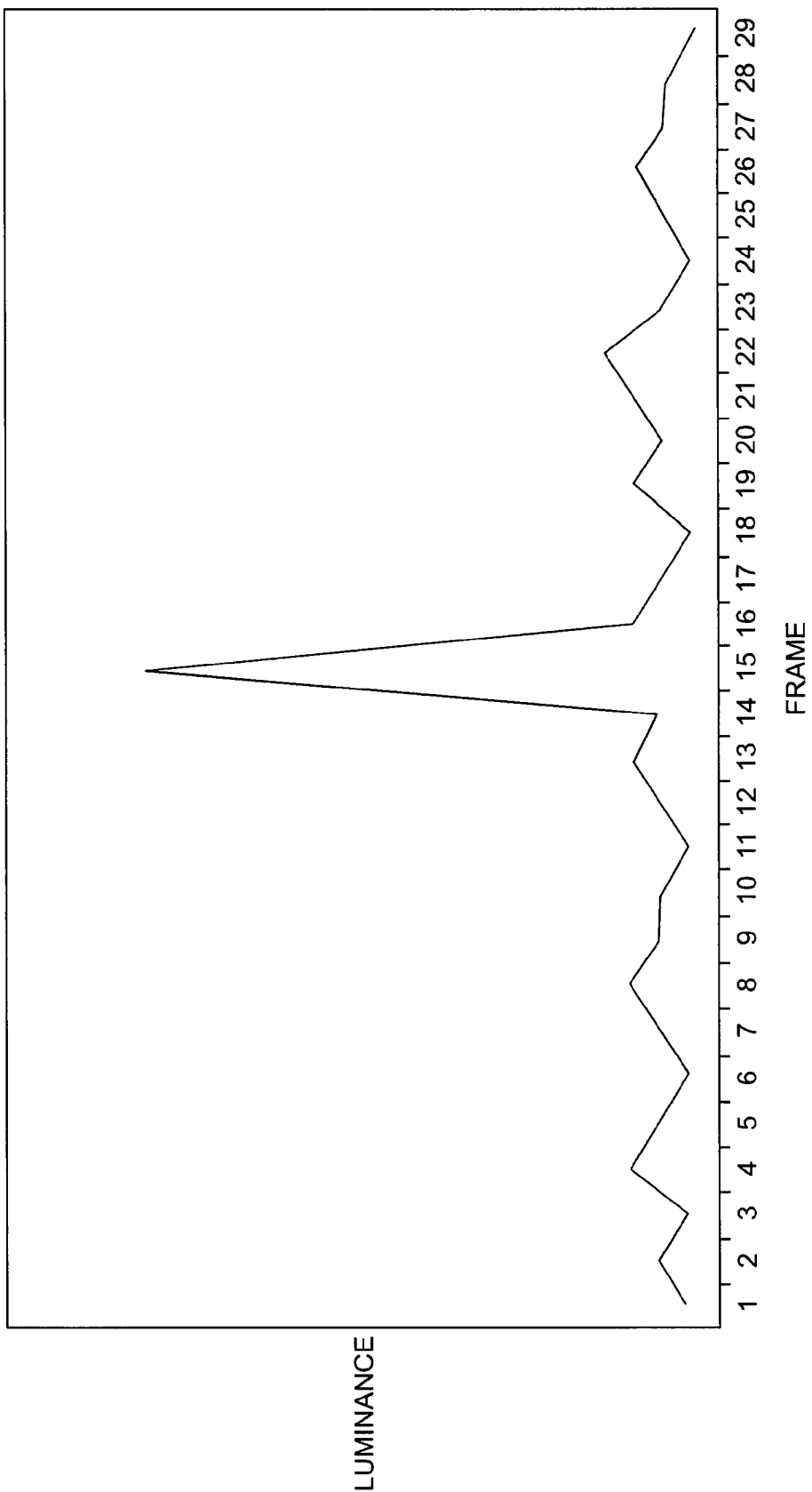
FIG. 5 shows an exemplary histogram illustrating a series of frames for a single source, single flash luminance.
Figure 6:
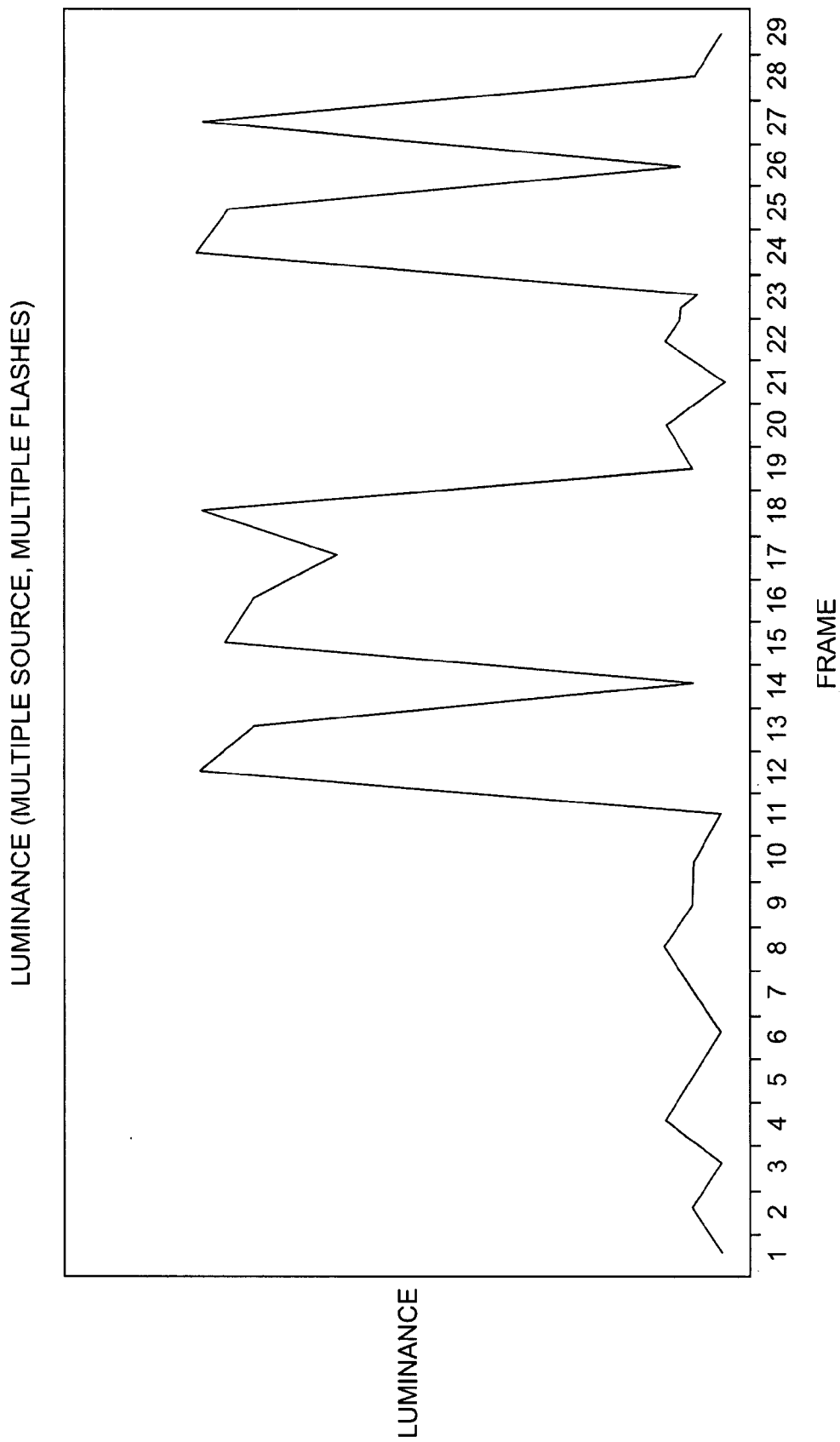
FIG. 6 illustrates an exemplary luminance histogram for the influence of multiple sources and multiple flashes.
Figure 7:
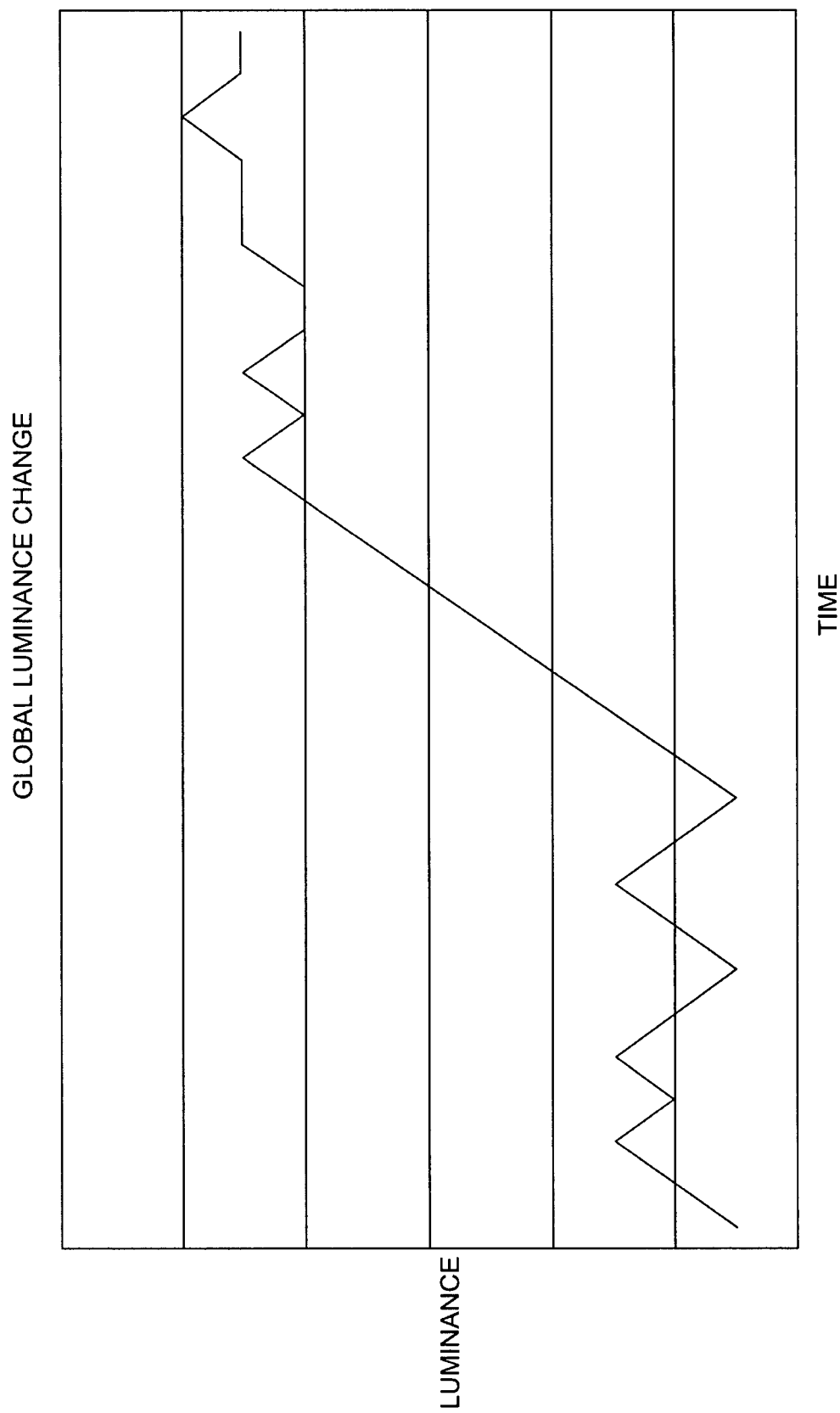
FIG. 7 illustrates an exemplary luminance histogram for the influence of a global luminance change over time.
Figure 8A:
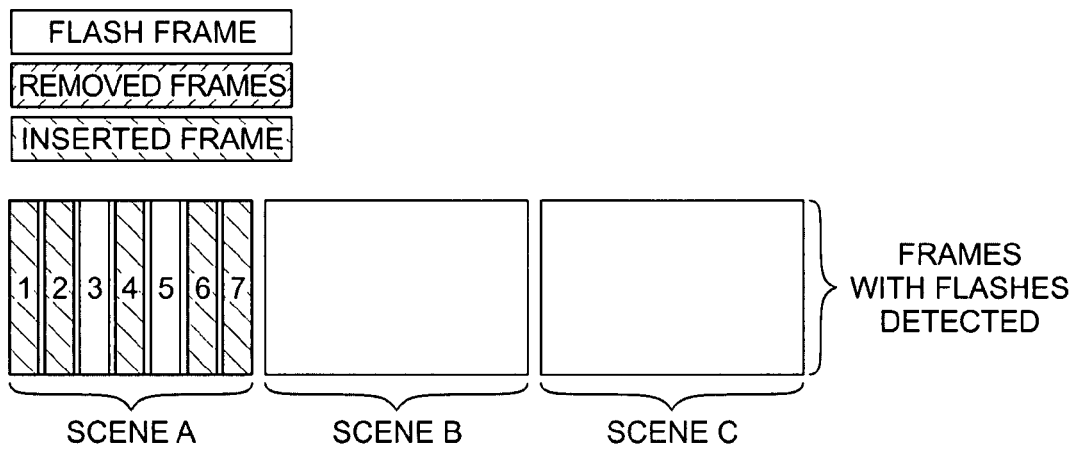
FIG. 8 provides an example of frame analysis, within one of multiple scenes, in which a flash has occurred.
Figure 8B:
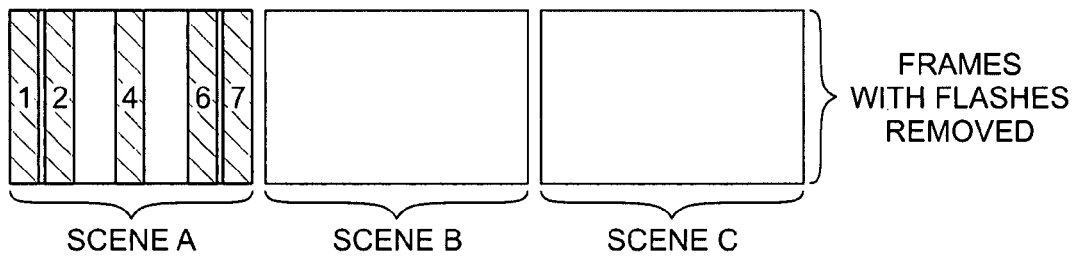
Figure 8C:
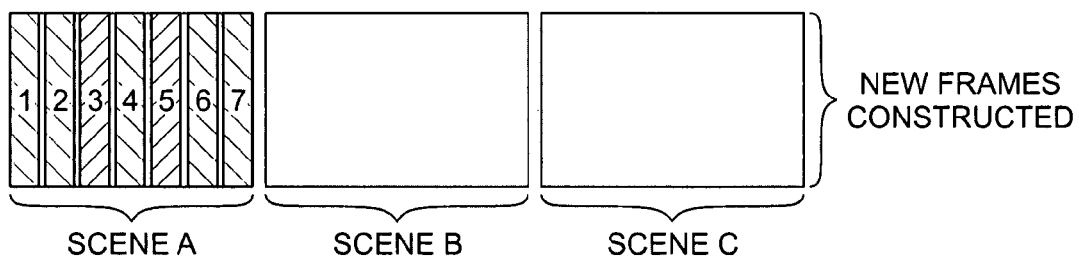
Figure 8D:
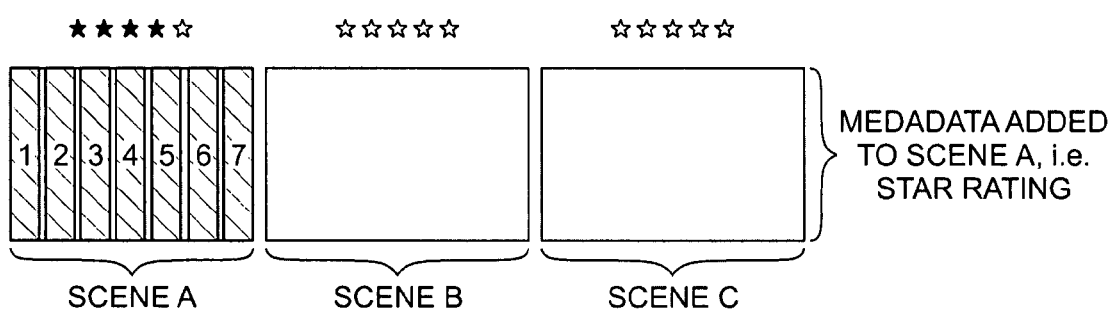

FIG. 3 is a flow chart showing the processing sequence of the flash detection function of the first embodiment. In step S300, the video input unit 200 inputs a video image to be processed. In step S310, the frame extraction unit 210 extracts each frame from the moving image to be processed, and sends it to the flash check unit 220. It is checked in step S320 if a luminance computation is equal to or larger than a threshold value (the method of detecting and determining flash artifacts is described in greater detail below with reference to FIG. 7). The threshold value is obtained by experiments, and is not limited to a specific value. If a flash is emitted, one or more frames with high luminance appear under the influence of the flash, as shown in, e.g., FIG. 4 at frame 15. At this time, a large luminance difference from the immediately preceding frame is generated in frame 15—beginning at frame 14 and ending at frame 16, as shown in FIG. 5, illustrating the corresponding luminance histogram for the influence of a single source single flash. Similarly, FIG. 6 illustrates the corresponding luminance histogram for the influence of multiple sources and multiple flashes, and FIG. 7 illustrates the corresponding luminance histogram for the influence of a global luminance change over time.

If it is determined in step S320 that the luminance change amount is equal to or larger than the threshold value M (YES in step S320), the flow advances to step S330. On the other hand, if the luminance change amount is smaller than the threshold value M (NO in step S320), the flow jumps to step S360.

In step S330, the timestamp at the point at which the change in luminance greater than or equal to M is detected is added to the videoclip.

The flow then advances to step S340 in which the detected flash is removed from the video by extracting the corresponding frames. In step S350, interpolated frames are calculated, based upon the previous and next frames from the frame in which the flash was detected, and the interpolated frames are inserted into the video for the removed frames.

It is checked in step S360 if frames to be processed still remain. If frames to be processed still remain (NO in step S360), the flow returns to step S310. On the other hand, if frames to be processed do not remain (YES in step S360), the processing ends.

The reconstructed/flash-corrected video may then be played back on the personal computer, allowing the viewer to easily locate the tagged clips of interest based upon the timestamps added at each detection of a flash.

Again, many home (consumer) videos constitute footage of great sentimental value. Often the most valuable sentimental moments in a video are those frames of the video that are distorted by flash photography capturing the exact moments that are important to the consumer. For example, Abby records video of her son's birthday party using her digital camcorder. She records two hours of video—including kids arriving to the party, opening presents, lighting the candles and singing happy birthday. While recording the opening presents and blowing out the birthday candles, several of the guests take photographic pictures with a flash camera. After the birthday party ends, Abby connects her digital video camera to her computer. The video is acquired from her device and downloaded onto her computer. During acquisition, the video is analyzed and photo flashes are detected. The timestamp(s) where the flash(es) occurs is added to the video clip—and this metadata may later be used when creating a movie.

Of course based upon predetermined parameters, rules can be applied during the acquisition process to tag video clips as having a higher rating or importance. For example, if two or more flashes are detected within 3 seconds of each other, the video clip can be tagged as a 4 star rated clip. Once the video is in the digital library, clips of high importance (e.g., 4 stars), can be easily searched. In this example, this could include scenes from blowing out the birthday candles and opening presents.

Next, the flash is removed from the video by extracting the flash frames and in order to maintain the video, newly-generated interpolated frames are inserted. The new interpolated frames may be automatically calculated from the previous and next frames from where the flash occurred.

FIG. 8 provides an example of frame analysis, within one of multiple scenes, in which a flash has occurred. As shown, in FIG. 8(a), two flashes have been detected in Scene A, one in frame 3 and the other in frame 5 (i.e., one or more regions of the entire frame showed a sudden increase in luminance that was above a particular threshold). Scenes B and C represent the vast majority of typical raw video, namely, scenes during which no flash photography is detected. As such, there are no detected flashes, there are no flashes to remove, and there is no indication that this footage contains a point of high interest. Continuing on to FIG. 8(b), each of frames 3 and 5 in Scene A has been removed. Based upon the previous and following frames, in FIG. 8(c) each of frames 3 and 5 is then replaced with interpolated frames. Finally, in FIG. 8(d), metadata has been added to Scene A indicating that the scene is a "four star" scene (or is likely a scene of interest, as two flashes were detected). This metadata is automatically added based upon predetermined input and enables a viewer to search for scenes that are of higher importance.

Figure 9:
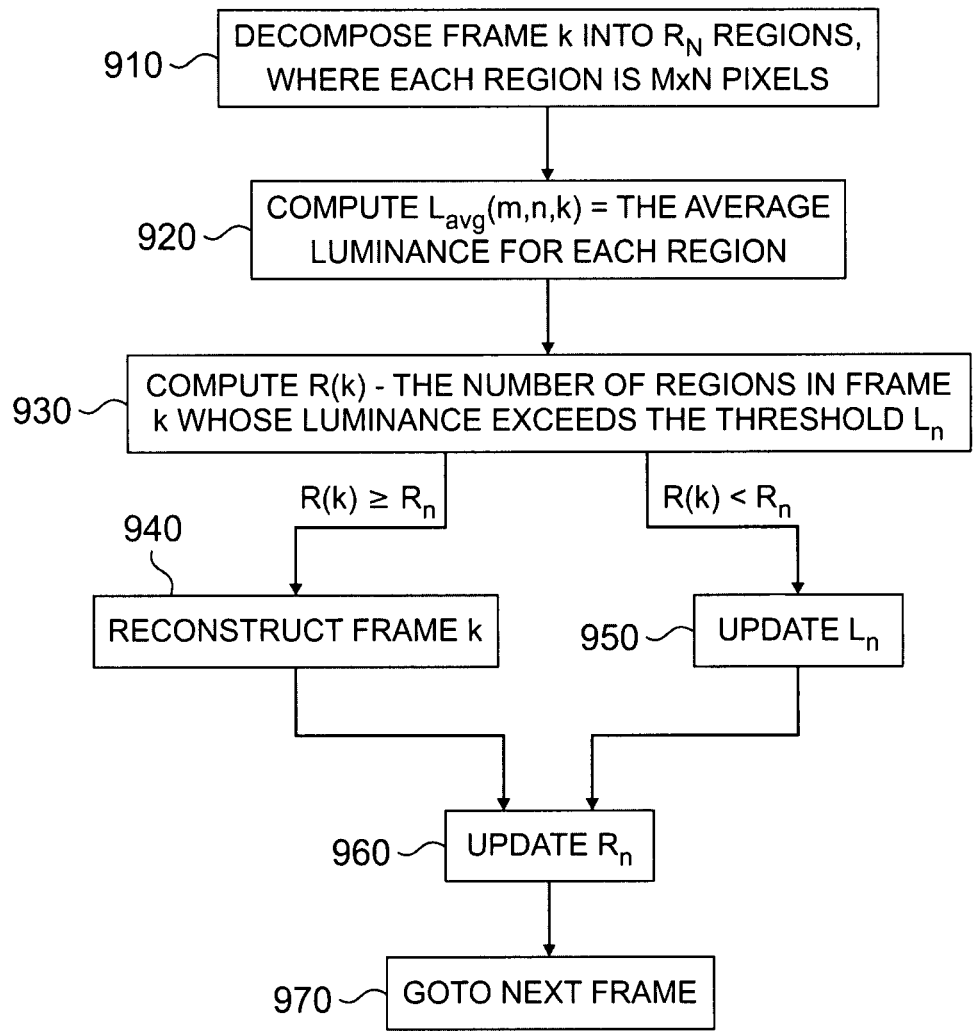
FIG. 9 is a flow chart showing further details of an illustrative processing sequence of a flash detection, removal and timestamp functions in one embodiment.

Continuing to FIG. 9, further details are provided on one illustrative embodiment of detecting and removing flash artifacts. First, in step 910, each frame k of a raw video stream is decomposed into a series of regions of M×N pixels ($R_N$ regions of M×N pixels). This regional analysis of the video frame allows for a much finer control over some of the thresholding parameters later discussed. The regional analysis also allows for more flexibility in the algorithm itself, as the case where (M,N) equals the width and height of the video frame provides the simple case of full frame analysis, and decreasing values of M and N yield progressively finer analysis resolutions (i.e., the goal is to detect all flash events in the video frame, even if those flash events are focused on a subset of the subjects in the video frame).

Once the frame has been decomposed into regions, the next step, step 920, calculates the average luminance value for each region, $L_{avg}(m,n,k)$ at frame k (the average luminance over each region may of course be calculated using any of the known standard luminance calculations). A function $F_L(i,j,k)$ is defined to be the luminance of pixel (i,j) in frame k. There are many different standard ways to calculate $F_L(i,j,k)$, and typically involve a simple color space conversion. For example, if the source video is in RGB format, the luminance of pixel (i,j,k) can be defined to be:

$$F_L(i,j,k) = 0.2989 * f_R(i,j,k) + 0.5866 * f_G(i,j,k) + 0.1145 * f_B(i,j,k)$$

Where $f_R$, $f_G$, and $f_B$ are the respective RGB color components of pixel (i,j) at frame k. This is only one example of numerous well-known luminance calculations (of course the concepts discussed herein are equally applicable to video stored not just in RGB format, but in any other format as well, although different formulas would be used to calculate the corresponding luminance).

The average luminance value, $L_{avg}$ is defined as follows (where W and H are the width and the height of the video frame, respectively):

$$L_{avg}(m,n,k) = \frac{1}{M*N} \sum_{i=0}^{M} \sum_{j=0}^{N} F_L\left(i + \frac{m*W}{M}, j + \frac{n*H}{N}, k\right)$$

In order to help track which regions are potentially illuminated by a flash, a luminance threshold value, $L_\alpha$ is maintained. In step 930, R(k), which is defined to be the number of regions in frame k whose luminance value exceeds $L_\alpha$, is calculated, as in:

$$R(k) = \sum_m \sum_n \begin{cases} L_{avg}(m,n,k) \geq L_\alpha \Rightarrow 1 \\ L_{avg}(m,n,k) < L_\alpha \Rightarrow 0 \end{cases}$$

Given this local count of regions whose luminance exceeds the luminance threshold, a frame k is then defined to be a flash frame if $R(k) \geq R_\alpha$, where $R_\alpha$ is a global threshold related to the number of regions which must be exceeded for this frame to qualify as a flash frame. If $R(k) < R_\alpha$, then the frame remains, and the luminance threshold value $L_\alpha$ is updated (step 950). An adaptive thresholding mechanism may be used to determine $L_\alpha$. If however $R(k) \geq R_\alpha$, a determination is made that the frame has a flash artifact, and in step 940, frame k is reconstructed so as to remove the flash artifact and reconstruct the frame with an interpolated value.

In one embodiment, the luminance value of every pixel (i,j) in flash frame k is replaced with the global weighted luminance average divided by the local luminance average, leaving the chrominance components untouched. In other words, the luminance value of each pixel in that frame is scaled by how far it deviates from the global average. This is a simple and fast method to "smooth" out the brightness of flash frames by adjusting the luminance of each pixel in the flash frame(s) without adjusting the chrominance of these same pixels.

In an alternative embodiment, a similar procedure is performed, but on a localized scale. For the simple one source flash scenario, this means the new luminance value of frame k can be calculated as:

$$L'_k = \frac{L(k-1) + L(k+1)}{2}$$

In other words, the luminance value in every pixel (i,j) of frame k should be the average of the luminance values of the frames immediately surrounding it.

However, in a multi-source flash scenario, the frames before and after the current frame whose average L values are less than the global threshold value are determined and are used (rather than the immediately surrounding frames).

After reconstructing frame k (step 940) or updating $L_\alpha$, (step 950), the process continues to step 960, in which the global threshold related to the number of regions which must be exceeded for a frame to qualify as a flash frame, $R_\alpha$, is updated, and then the process continues to the next frame (step 970).

Therefore, the flash frame(s) in a digital video are automatically detected, eliminated and replaced, and using the flash frame(s) as the timestamp, and the video clip is categorized and tagged as a relevant area of the digital video.

While the above description focuses on typical home video users, it should be appreciated that the concepts are also applicable to any other application in which the detection and removal of lighting (flash or other) artifacts would be useful, including, for example, military applications in which detection of light artifacts of videos shot at night would be valuable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for analyzing a recorded video, including detecting a flash in a frame of the recorded video and tagging the video at the detected frame, the method comprising the steps of:
   extracting a first frame of the recorded video;
   comparing a luminance calculation of each of a series of regions of said frame to a threshold value, wherein if said luminance calculation of a number of regions of said frame is greater than the threshold value:
      determining that a flash has occurred at a first timestamp corresponding to said first frame;
      removing the extracted first frame from the recorded video;
      generating and inserting a corrected frame into a first location corresponding to the removed extracted first frame; and
      using the first timestamp, tagging the recorded video at the first location on the recorded video with additional metadata fields to indicate at least one flash was detected at the first location, and
   wherein if said luminance calculation is greater than the threshold value, the additional metadata fields from the step of tagging the recorded video at the first location on the recorded video, remain at the first location on the recorded video after said generating and inserting steps.

2. The method of claim 1, wherein the corrected frame is generated as an interpolated value calculated based upon the frames preceding and succeeding the extracted first frame.

3. The method of claim 1, wherein if a determination is made in said determining step that said luminance calculation is less than the threshold value, the method extracts a next frame of the recorded video and repeats said determining step.

4. The method of claim 1, wherein the additional metadata fields added at the first location on the recorded video are added based upon predefined parameters.

5. The method of claim 4, wherein said predefined parameters include detecting a number of flashes within a predetermined elapsed video time.

6. The method of claim 4, wherein said predefined parameters include detecting a single flash within a predetermined elapsed video time.

7. A method for analyzing a recorded video during acquisition, including detecting a flash in the recorded video and tagging the video at a corresponding frame, the method comprising the steps of:
   analyzing the recorded video;
   detecting a photo flash in said recorded video at a frame at a first location at a first timestamp corresponding to said first location, wherein a photo flash is detected when a luminance calculation of a number of regions of said first frame is greater than a threshold value;
   using the first timestamp, tagging the recorded video at the first location on the recorded video with additional metadata fields to indicate at least one photo flash was detected at the first location;
   removing the frame from the recorded video; and
   generating and inserting a corrected frame into the first location,
      wherein the corrected frame is generated as an interpolated value calculated based upon the frames preceding and succeeding the extracted first frame; and
      wherein a tag of additional metadata fields, inserted at the first location in said tagging step, remains at the first location on the recorded video after said generating and inserting steps.

8. The method of claim 7, wherein if said luminance calculation is less than the threshold value, the method extracts a next frame of the recorded video and repeats said analyzing step.

9. The method of claim 7, wherein the additional metadata fields added at the first location on the recorded video are added based upon predefined parameters.

10. The method of claim 9, wherein said predefined parameters include detecting a number of flashes within a predetermined elapsed video time.

11. The method of claim 9, wherein said predefined parameters include detecting a single flash within a predetermined elapsed video time.

12. A computer-readable medium, not comprising a propagated signal, containing instructions which, when executed by one or more processors disposed in an electronic device, performs a method for removing a photo flash from a recorded video, the method comprising the steps of:
   determining the presence/absence of a flash portion in the recorded video on the basis of brightness values between neighboring frames, wherein a luminance calculation is performed on a series of regions of each frame in said determining step, and wherein said determining step determines that a flash portion is present at a first timestamp corresponding to a first frame when a threshold number of regions of the first frame has a brightness value not less than a threshold value;
   using the first timestamp, tagging the video at the corresponding first frame location on the recorded video with additional metadata fields indicating the presence of a flash at the first frame location;
   removing the first frame containing the flash from the recorded video; and
   generating and inserting a corrected frame into the location of the first frame,
      wherein a tag including the additional metadata fields inserted at the first frame location on the recorded video indicating the presence of a flash in said tagging step remains at the first frame location on the recorded video after said generating and inserting steps.

13. The method performed by the computer readable medium of claim 12 wherein the corrected frame is generated as an interpolated value calculated based upon the frames preceding and succeeding the first frame.

14. The method performed by the computer readable medium of claim 12, wherein if said luminance calculation is less than the threshold value, the method extracts a next frame of the recorded video and repeats said determining step.

15. The method performed by the computer readable medium of claim 12, wherein the additional metadata fields added at the first location on the recorded video are added based upon predefined parameters.

16. The method performed by the computer readable medium of claim 15, wherein said predefined parameters include detecting a number of flashes within a predetermined elapsed video time.

17. The method performed by the computer readable medium of claim 15, wherein said predefined parameters include detecting a single flash within a predetermined elapsed video time.

\* \* \* \* \*